United States Patent
Hartvigsen et al.

(10) Patent No.: US 6,265,095 B1
(45) Date of Patent: Jul. 24, 2001

(54) INTERCONNECT FOR SOLID OXIDE FUEL CELLS

(75) Inventors: Joseph Jay Hartvigsen, Kaysville; Singaravelu Elangovan, Sandy; Ashok Chandrashekhar Khandkar, Salt Lake City, all of UT (US)

(73) Assignee: Sofco, New Orleans, LA (US)

( * ) Notice: Subject to any disclaimer, the term of this patent is extended or adjusted under 35 U.S.C. 154(b) by 0 days.

(21) Appl. No.: 09/259,711

(22) Filed: Mar. 1, 1999

(51) Int. Cl.[7] .................................................. H01M 8/04
(52) U.S. Cl. ................... 429/32; 429/30; 429/31; 429/34; 429/35; 429/36
(58) Field of Search ................. 429/30, 31, 32, 429/34, 35, 36

(56) References Cited

U.S. PATENT DOCUMENTS

| | | | |
|---|---|---|---|
| 4,857,420 | * 8/1989 | Maricle et al. | 429/32 |
| 5,460,897 | * 10/1995 | Gibson et al. | 429/32 |
| 6,054,231 | * 4/2000 | Virkar et al. | 429/34 |

\* cited by examiner

*Primary Examiner*—Mark F. Huff
*Assistant Examiner*—Daborah Chacko-Davis
(74) *Attorney, Agent, or Firm*—Factor & Partners

(57) ABSTRACT

An interconnect for solid oxide fuel cells comprises a separator having a cathode side and an anode side, and, at least one compliant sheet of material associated with one of the cathode side and the anode side of the separator. The anode side is associateable with an anode of a first adjacent cell. The cathode side is associateable with a cathode of a second adjacent cell. The at least one compliant sheet of material electrically and mechanically connects the respective anode or cathode with the respective side of the separator plate.

18 Claims, 2 Drawing Sheets

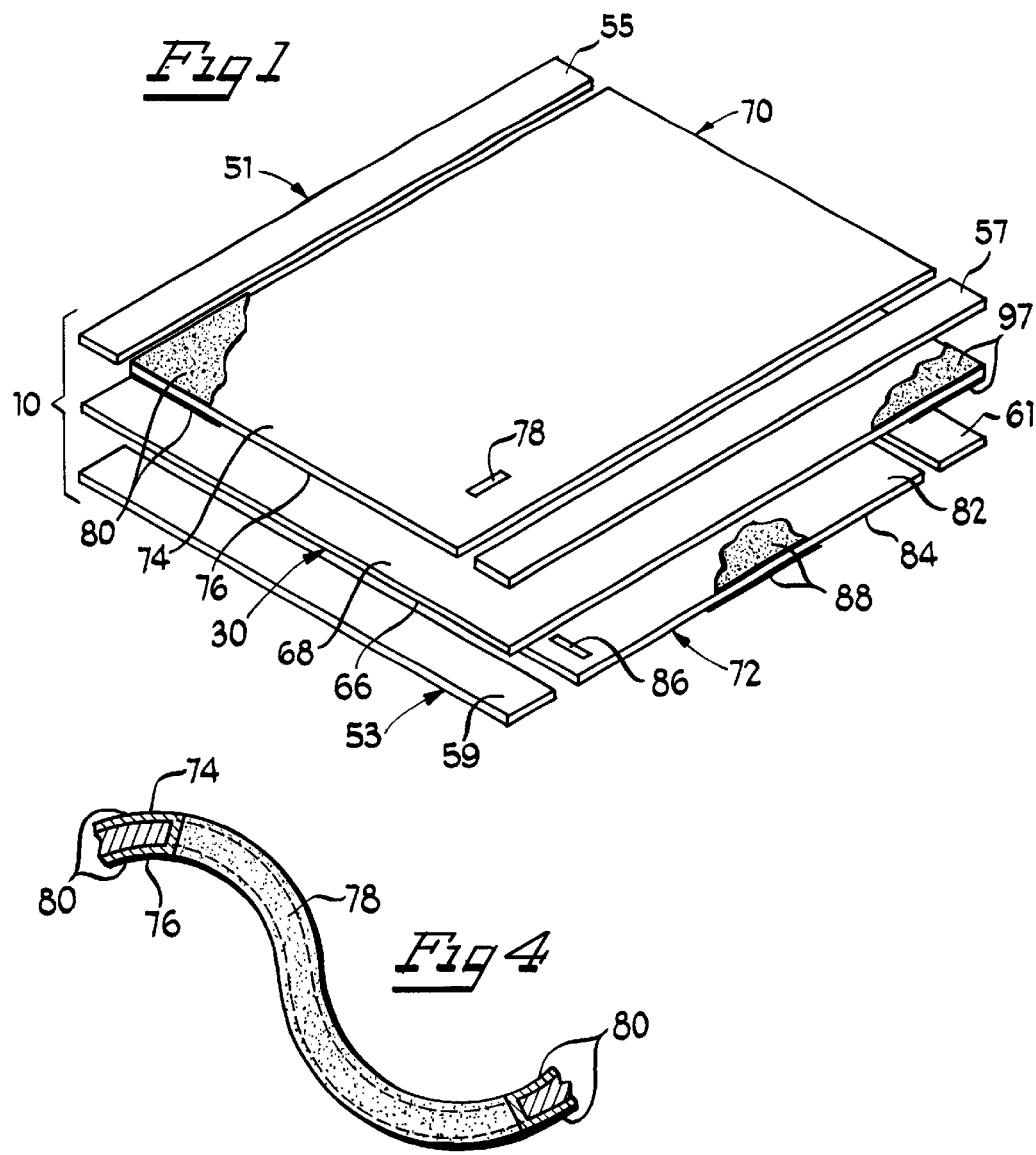
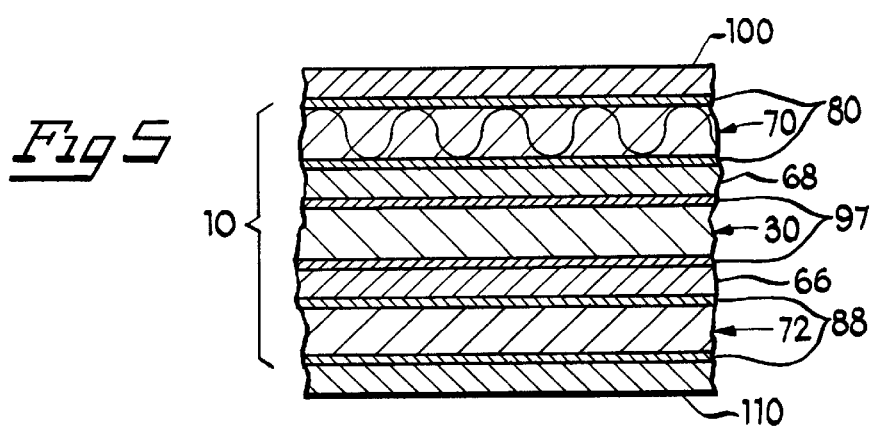

INTERCONNECT FOR SOLID OXIDE FUEL CELLS

BACKGROUND OF THE INVENTION

1. Field of the Invention

The present invention is directed to Solid Oxide Fuel Cells ("SOFC's"), and more particularly to an interconnect for use in solid oxide fuel cells.

2. Background Art

Two large barriers to market competitive SOFC's are interconnect functionality and cost. The design of a SOFC interconnect is important because the interconnect serves several functions, including, providing reactant gas separation and containment, providing mechanical support to the cells and providing a low resistance path for current to connect the cells in series. Although monolithic interconnects of lanthanum chromite and high chromium alloys have been used with some success, such interconnects have proven to be excessively costly and compromise certain aspects of interconnect functionality.

In particular, since the interconnect performs a multitude of functions, often it is necessary to compromise the performance of one function to enhance the performance with respect to another function of the interconnect. For example, the interconnect has an electrical function inasmuch as it provides a path by which to electrically connect cells in series, and the interconnect also has a mechanical function, namely, to provide mechanical support to the cell.

With respect to such functions, it is necessary to, for example, match coefficients of thermal expansion (CTE) between the cell and the interconnect, to provide support for the cell and also to facilitate gas containment. If the interconnect does not match the remainder of the cell with respect to the CTE, the structure may lose mechanical integrity and gas may leak out of the cell, thereby adversely affecting the efficiency of the cell. Often times, an interconnect, such as a monolithic interconnect that exhibits superior performance with respect to this mechanical function, may exhibit an unacceptable electrical conductive performance. Accordingly, to develop a suitable monolithic interconnect, it becomes necessary to sacrifice performance with respect to one function of the interconnect, such as the mechanical function, to increase performance with respect to another function of the interconnect, such as the electrical conductivity.

SUMMARY OF THE INVENTION

The invention comprises an interconnect for solid oxide fuel cells. The interconnect comprises a separator plate and a compliant material. The separator plate includes an anode side associateable with an anode of a first adjacent cell and a cathode side associateable with a cathode of a second adjacent cell. The compliant material is associated with at least one of the anode side of the separator plate and the cathode side of the separator plate. In turn, the compliant material provides mechanical support and electrical contact between the separator plate and the respective anode or cathode.

In a preferred embodiment, the at least one compliant sheet of material is positioned on the anode side of the separator plate. In such a preferred embodiment, another compliant sheet of material is positioned on the cathode side of the separator plate.

In another preferred embodiment, the at least one compliant sheet of material includes a plurality of openings extending therethrough. In such a preferred embodiment, the at least one compliant sheet of material includes a conductive coating applied to at least a portion of an upper and lower surface thereof. The coating may extend about a periphery of the at least one opening in the at least one compliant sheet of material. Thus, the coating on the upper surface and the lower surface are electrically connected. As an example, the coating may comprise AgPd or lanthanum cobaltite.

In yet another preferred embodiment, the at least one compliant material comprises a corrugated pattern having flutes. The at least one opening may comprise an elongated slot having its length substantially transverse to the flutes of the corrugated sheet.

In another preferred embodiment, the separator plate includes a coating applied to at least a portion of one of the cathode side and the anode side thereof.

In yet another preferred embodiment, the interconnect may further include means for sealing the anode side to the anode of the first adjacent cell and the cathode side to the cathode of a second adjacent cell. This, in turn, separates fuel and air flows past the cells.

The invention further comprises a method for manufacturing an interconnect for a solid oxide fuel cell comprising the steps of: providing the separator plate having the anode and cathode sides; associating the compliant sheet of material with one of the two sides; associating the anode side with an anode of a first adjacent cell; and associating the cathode side of the separator plate with a cathode of a second adjacent cell.

In a preferred embodiment, the step of associating the compliant sheet of material may further comprise the steps of: associating a first compliant sheet of material with the anode side of the separator plate, and associating a second compliant sheet of material with the cathode side of the separator plate.

In yet another preferred embodiment, wherein the compliant material includes an opening extending therethrough, the method further includes the step of applying a conductive coating to at least a portion of the first compliant sheet of material.

In another preferred embodiment, the method includes the step of applying a conductive coating on at least a portion of the separator plate.

The invention likewise includes a method for transferring electric current between two adjacent cells of a solid oxide fuel cell. The method comprises the steps of: providing a cathode side of a first adjacent cell; providing an anode side of a second adjacent cell; associating a compliant material with one of the anode and the cathode of the respective adjacent cells; positioning a separator plate between the compliant sheet of material and the other of the anode and the cathode which is not associated with the compliant sheet of material; and activating the first and second adjacent cells, to in turn, generate electrical current.

BRIEF DESCRIPTION OF THE DRAWINGS

FIG. 1 of the drawings is an exploded view of an interconnect of the present invention;

FIG. 4 of the drawings is a partial cross-sectional view of the compliant sheet taken generally about lines 4—4 of FIG. 2; and FIG. 5 of the drawings is a cross-sectional view of the interconnect of the present invention positioned between a first and second adjacent cell.

DETAILED DESCRIPTION OF THE DRAWINGS

Figure 2:
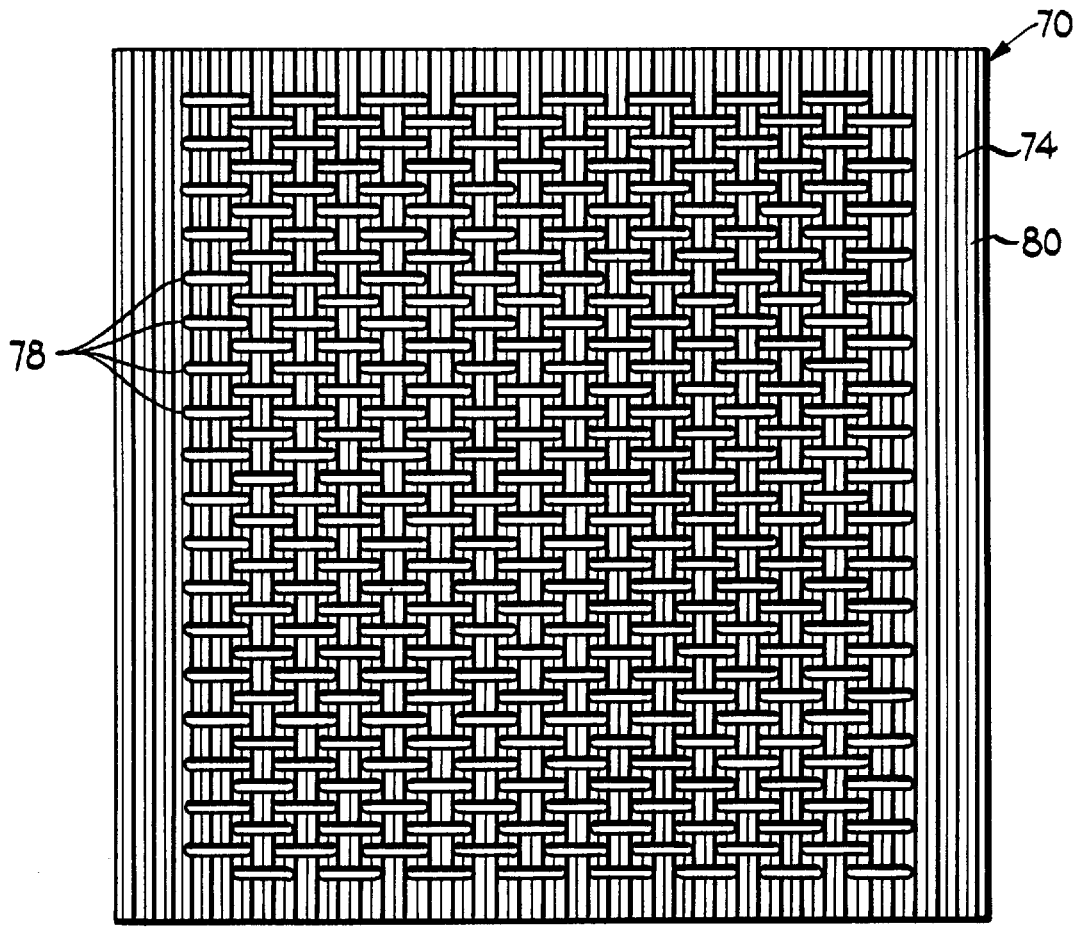
FIG. 2 of the drawings is a top plan view of the compliant sheet used with the interconnect of the present invention.
Figure 3:
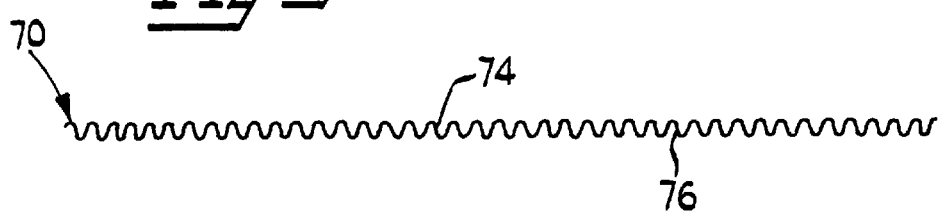
FIG. 3 of the drawings is a side elevational view of a compliant sheet of the present invention.

While this invention is susceptible of embodiment in many different forms, there is shown in the drawings and will herein be described in detail, several specific embodiments, with the understanding that the present disclosure is to be considered as an exemplification of the principles of the invention and is not intended to limit the invention to the embodiments illustrated.

Interconnect 10 is shown in FIG. 1 as comprising separator plate 30, upper end rails 51, lower end rails 53, first compliant sheet of material 70 and second compliant sheet of material 72. Interconnect 10 is shown in its intended environment in FIG. 5 as being positioned between anode 100 of a first adjacent cell and cathode 110 of a second adjacent cell, all of which may be a part of a larger stack of cells.

Separator plate 30 is shown in FIG. 1 as including anode side 66, cathode side 68 and coating 97. The separator plate may be selected from any of the ceramic, alloy or combination ceramic/alloy materials conventionally used in association with the interconnect of a monolithic cell. Coating 97 may be applied to one or both of the anode side and the cathode side of the separator plate. The coating may comprise a variety of conductive materials including AgPd and lanthanum cobaltite. As will be explained in further detail below, inasmuch as the mechanical and electrical functions of the interconnect are separated among the various components, there is no need to match the CTE of the interconnect with the CTE of other components.

Upper end rails 51, as shown in FIG. 1, include first upper end rail 55 and second upper end rail 57, both of which are positioned on opposite edges of anode side 66 of separator plate 30. Similarly, lower end rails 53 include first lower end rail 59 and second lower end rail 61, both of which are positioned on opposite edges of cathode side 68 of separator plate 30. As can be seen, the lower end rails are positioned so as to be substantially perpendicular with respect to the upper end rails. As will be understood, these end rails provide fuel/air separation and gas isolation and containment for the cell.

First compliant sheet of material 70 is shown in FIG. 1 as including upper surface 74, lower surface 76, openings, such as openings 78 and coating 80. While various shapes are contemplated for use, first compliant sheet of material 70 is herein described as comprising a corrugated sheet having a substantially uniform thickness and a surface area which substantially corresponds to the exposed surface area of the anode side of the separator plate. While other materials are contemplated, the first compliant sheet of material may comprise a metal or alloy thereof, having an approximate thickness of 0.005 inches with 20 corrugations per inch. Of course, other shapes, including, stepped shapes, square wave shapes, accordion shapes, lanced offset, round crest, flat crest, sloped sides, vertical sides, among others, are likewise contemplated for use. It is also contemplated that the first compliant sheet of material may comprise a plurality of smaller sheets of material positioned in a side by side orientation to render a larger compliant sheet of material.

Openings 78 are shown in detail in FIG. 2 as comprising a series of uniform elongated slots extending through first compliant sheet of material 70. The openings are positioned so that the elongated dimension of each is transverse to the corrugations. In the embodiment shown, the openings are approximately 0.05 inches wide and approximately 0.30 inches long. The openings are spaced apart approximately 0.10 inches from each other in substantially uniform rows, with a space of about 0.05 inches between the rows of openings. Of course, the particular size, shape, quantity and/or orientation of the openings is not limited to the particular configuration disclosed.

Coating 80 (FIGS. 2 and 4) is applied to both upper surface 74 and lower surface 76 of first compliant sheet of material 70. As shown in particular in FIG. 4, the coating lines the interior surface of each of openings 78 thereby creating continuous conductivity between the coating applied to upper surface 74 and to lower surface 76. The coating may comprise a conductive material, such as, for example, Ni, AgPd, lanthanum cobaltite, praseodymium cobaltite, and lanthanum chromite. Of course, other conductive materials are likewise contemplated for use. As will be explained, the coating provides a means for conducting electric current from the cathode to the separator plate, and, in turn, to the adjoining cell. Of course, in certain embodiments, it may not be necessary to utilize a coating on the compliant sheet of material, and the current may be carried by the compliant sheet itself. The thickness of the coating may be between 0.001" and 0.020".

Second compliant sheet of material 72 is shown in FIG. 1 and may be substantially identical in construction to first compliant sheet of material 70. In particular, the second compliant sheet of material may likewise comprises an upper surface 82, lower surface 84, openings, such as openings 86 and coating 88. Of course, it is contemplated that second compliant sheet of material comprise a material different than first compliant sheet of material. Similarly, the coatings applied to each of the compliant sheets of material comprise different formulations and/or may omit such a coating altogether. It is also contemplated that only one of the two compliant sheets of material be used on one side of the separator plate 30, wherein a conventional interconnect structure may be used on the other side.

In operation, separator plate 30 does not make direct electrical contact with, or directly mechanically support the anode or the cathode. Rather, first compliant sheet of material 70 makes electrical contact with and provides mechanical support for the cathode, and second compliant sheet of material 72 makes electrical contact with and mechanical support for the anode. Accordingly, since separator plate 30 does not make direct contact with the cathode or anode, the thermal expansion of the separator plate does not need to be matched with the other cell components.

Openings 78 in first compliant sheet of material 70 (located on the anode side of separator plate 30), serve to permit fuel passing on either side of the compliant material to react with the anode. Without the openings, approximately only half of the fuel passing between the compliant sheet of material and separator plate 30 would have an opportunity to react with the anode. The remaining fuel would be trapped between the compliant sheet (within the corrugations) and the separator plate until exiting the cell stack. Inasmuch as the airflow on the cathode side is typically in excess of twice the stoichiometric condition for cooling purposes, the electrochemical advantage of the openings on the cathode side is minimal.

With respect to electrical conductivity, where the coating is applied to the upper and lower surfaces of both of the compliant sheets of material, electrical current can pass along the coated surface instead of through the compliant sheets of material. As a result, the current can spread over the entire surface coating of the material rather than being concentrated in certain regions. It will be understood that where the compliant material does not have a coating, the electrical charge will proceed through the compliant material itself.

In certain SOFC's, transfer of current through the compliant sheet of material without a coating is sufficient for cell performance. Indeed, in certain instances, such where the anode comprises nickel, a compliant material made of nickel without a coating is generally sufficient. In most embodiments, however, the passage of electrical current along the coating instead of through the compliant material improves the efficiency of the cell. In particular, and among other advantages, by conducting electrical current along the coating, resistive losses are reduced. Such losses are particularly high on the cathode side where metal scales can be significant (in some cases, the second compliant sheet of material on the anode side may be made of nickel in which case, as explained above, it may be utilized without a coating). In addition, by also applying a coating to the separator plate, the current is not only distributed more evenly about the entirety of the compliant sheets of material, but also spread throughout the entirety of separator plate 30. This further reduces scale resistance losses compared with concentrating the current at the points of contact between separator plate 30 and the respective compliant sheet of material.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An interconnect for solid oxide fuel cells comprising:
   a separator plate having an anode side associateable with an anode of a first adjacent cell and a cathode side associateable with a cathode of a second adjacent cell; and
   at least one compliant sheet of material associated with at least one of the anode side of the separator plate and the cathode side of the separator plate, to, in turn, provide mechanical support and electrical contact between the separator plate and the respective anode or cathode, the at least one compliant sheet of material includes a conductive coating applied to at least a portion of an upper and lower surface thereof, and extends about a periphery of at least one opening extending through the at least one compliant sheet of material, to, in turn, continuously connect the coating about the upper and lower surface thereof.

2. The interconnect according to claim 1 wherein the at least one compliant sheet of material is positioned on the anode side of the separator plate.

3. The interconnect according to claim 1 wherein the at least one compliant sheet of material is positioned on the cathode side of the separator plate.

4. The interconnect according to claim 1 wherein the at least one compliant sheet of material includes a plurality of openings extending therethrough.

5. The interconnect according to claim 1 wherein the conductive coating is selected from the group consisting of Ni, AgPd, lanthanum cobaltite, praseodymium cobaltite, and lanthanum chromite.

6. The interconnect according to claim 1, wherein the separator plate includes a coating applied to at least a portion of one of the cathode side and the anode side thereof.

7. The interconnect according to claim 1, wherein the separator plate includes a coating applied to at least a portion of one of the cathode side and the anode side thereof.

8. The interconnect according to claim 1 wherein the at least one compliant sheet of material comprises a corrugated sheet of material.

9. The interconnect according to claim 8 wherein the corrugated sheet of material comprises a cross-section having the shape of one of a sinusoid, dimpled, square wave, lanced offset, round crest, flat crest, sloped sides, and vertical sides.

10. The interconnect according to claim 1 further including means for sealing the anode side to an anode of the first adjacent cell, and the cathode side to the cathode of a second adjacent cell, to, in turn, separate fuel and air flows past the cells.

11. The interconnect according to claim 1 wherein the at least one compliant sheet of material comprises at least one compliant sheet of material positioned on either side of the separator plate.

12. An interconnect for solid oxide fuel cells comprising:
    a separator plate having an anode side associateable with an anode of a first adjacent cell and a cathode side associateable with a cathode of a second adjacent cell; and
    at least one compliant sheet of material associated with at least one of the anode side of the separator plate and the cathode side of the separator plate, to in turn, provide mechanical support and electrical contact between the separator plate and the respective anode or cathode, the at least one compliant sheet of material includes at least one opening extending therethrough,
    wherein the at least one compliant sheet of material comprises a corrugated pattern having flutes.

13. The interconnect according to claim 12, wherein the at least one opening comprises an elongated slot having its length substantially transverse to the flutes of the corrugated pattern.

14. A method for manufacturing an interconnect for a solid oxide fuel cell comprising the steps of:
    providing a separator plate having an anode side and a cathode side;
    associating a compliant material with at least one of the anode or cathode side of the separator plate, the compliant material including at least one opening extending therethrough;
    associating the anode side of the separator plate with an anode of a first adjacent cell; and
    associating the cathode side of the separator plate with a cathode of a second adjacent cell,
    applying a conductive coating to at least a portion of the compliant material.

15. The method according to claim 14 wherein the step of associating the compliant material comprises the steps of:
    associating a first compliant material with the anode side of the separator plate; and
    associating a second compliant material with the cathode side of the separator plate.

16. The method according to claim 14 further comprising the step of:
    applying a conductive coating to at least a portion of the separator plate.

17. A method for transferring electric current between two adjacent cells of a solid oxide fuel cell comprising the steps of:

providing a cathode side of a first adjacent cell;

providing an anode side of a second adjacent cell;

associating a first compliant material with one of the anode side of the second adjacent cell and the cathode side of the first adjacent cell, the compliant material including at least one opening extending therethrough;

applying a conductive coating to at least a portion of the first compliant material, positioning a separator plate between the first compliant material and the other of the anode and the cathode side which is opposite the side associated with the first compliant material; and activating the first and second adjacent cells.

18. The method according to claim 17 further comprising the step of associating a second compliant material on the opposite side of the separator plate from the first compliant material.

* * * * *